(12) United States Patent
Baumann et al.

(10) Patent No.: US 11,345,077 B2
(45) Date of Patent: May 31, 2022

(54) METHOD FOR PRODUCING A CONTAINER SYSTEM AND A LIQUID DISPENSER, AS WELL AS CONTAINER SYSTEM PRODUCED IN THIS WAY AND LIQUID DISPENSER PRODUCED IN THIS WAY

(71) Applicant: APTAR RADOLFZELL GMBH, Radolfzell (DE)

(72) Inventors: Tobias Baumann, Constance (DE); Frédéric Duquet, Crespières (FR); Ulrich Maibach, Radolfzell (DE)

(73) Assignee: APTAR RADOLFZELL GMBH, Radolfzell (DE)

( * ) Notice: Subject to any disclaimer, the term of this patent is extended or adjusted under 35 U.S.C. 154(b) by 113 days.

(21) Appl. No.: 16/482,072

(22) PCT Filed: Feb. 20, 2018

(86) PCT No.: PCT/EP2018/054096
§ 371 (c)(1),
(2) Date: Jul. 30, 2019

(87) PCT Pub. No.: WO2018/162217
PCT Pub. Date: Sep. 13, 2018

(65) Prior Publication Data
US 2020/0114569 A1 Apr. 16, 2020

(30) Foreign Application Priority Data
Mar. 9, 2017 (EP) ...................................... 17160186

(51) Int. Cl.
*B29C 63/26* (2006.01)
*B29L 31/00* (2006.01)
*B65D 83/00* (2006.01)

(52) U.S. Cl.
CPC .......... *B29C 63/26* (2013.01); *B65D 83/0055* (2013.01); *B29L 2031/712* (2013.01)

(58) Field of Classification Search
CPC ......... B29C 63/26; B29C 41/04; B29C 41/08; B29C 41/003; B29C 41/36; B29C 41/18;
(Continued)

(56) References Cited

FOREIGN PATENT DOCUMENTS

| EP | 0893356 A1 | 1/1999 |
| JP | 2001315746 A | 11/2001 |

(Continued)

OTHER PUBLICATIONS

International Search Report issued in Application No. PCT/EP2018/054096 dated Mar. 23, 2018 and English translation (7 pages).
(Continued)

*Primary Examiner* — Christopher J Besler
(74) *Attorney, Agent, or Firm* — Flynn Thiel, P.C.

(57) ABSTRACT

A method for producing a containing system for a liquid dispenser having a dimensionally stable outer container and a collapsible inner container, in the form of a pouch, arranged within the outer container. The method includes starting from the outer container, at least one layer of a pouch material being applied to an inner wall of the outer container. For this purpose, the pouch material is applied in the form of a liquid or powder to the inner wall, where, after solidifying or fusing, it forms a ply of a wall, of the inner container. The ply detaches from the inner wall of the outer container when the inner container collapses.

26 Claims, 8 Drawing Sheets

(58) Field of Classification Search
CPC ............... B29C 41/22; B65D 83/0055; B29L 2031/712; B29L 2009/00; B29L 2009/001; A61J 1/14; B29K 2023/086; B29K 2077/00; B29K 2105/251; B29K 2096/005; B29K 2105/0058
See application file for complete search history.

(56) References Cited

FOREIGN PATENT DOCUMENTS

| | | | |
|---|---|---|---|
| JP | 2002293317 A | 10/2002 | |
| WO | 8201176 A1 | 4/1982 | |
| WO | 9211187 A1 | 7/1992 | |
| WO | WO-2016113310 A1 * | 7/2016 | ............. B65D 23/10 |

OTHER PUBLICATIONS

Written Opinion of International Searching Authority issued in Application No. PCT/EP2018/054096, dated Mar. 23, 2018 (8 pages).

* cited by examiner

METHOD FOR PRODUCING A CONTAINER SYSTEM AND A LIQUID DISPENSER, AS WELL AS CONTAINER SYSTEM PRODUCED IN THIS WAY AND LIQUID DISPENSER PRODUCED IN THIS WAY

FIELD OF APPLICATION AND PRIOR ART

Liquid dispensers for dispensing cosmetic or pharmaceutical liquids are known. These liquid dispensers have a container system in which the liquid to be discharged is stored before being discharged.

Such liquid dispensers, the liquid reservoir of which is dimensionally stable, i.e. is either entirely rigid or returns to its original shape following a discharging operation, require, unlike for example tubes, volume compensation in the form of inflowing air, in order that a use-inhibiting negative pressure does not gradually build up in the liquid reservoir.

However, with the inflowing air, contamination of the liquid is also possible in principle. But even aside from contamination, the inflow of air can be problematic, since it causes oxidation processes that, depending on the liquid, can negatively affect the effectiveness or smell thereof.

In order to prevent this, systems referred to as "airless" systems are known, in which the inflowing air remains isolated from the liquid. Here, in addition to trailing-piston systems, container systems having a dimensionally stable outer container and a collapsible container arranged within the outer container represent an important group. In these systems, which, together with their production methods, form the generic type for the present invention, the air flows into an intermediate region between the inner wall of the outer container and the outer side of the pouch-like inner container. The outer volume of the pouch decreases as the liquid reservoir becomes increasingly empty, wherein the air that has flowed in prevents the formation of a negative pressure.

The abovementioned container systems having a pouch can be produced in that, first of all, the pouch-like inner container and the outer container are produced separately and then the inner container is inserted into the outer container. This method is relatively complicated. Moreover, in this way, it is quite difficult to use up all the available space in the outer container with the inner container, in particular when the latter has a shape other than a cylinder.

In addition, a system is also known in which the outer container and the inner container are produced together in that a coextrusion process is used to create a double-walled hollow profile, which is then split into individual cylindrical parts by separating operations. After a number of further processing steps, each of these parts forms a container system, wherein the inner ply of the hollow profile forms the pouch-like inner container and the outer ply forms the outer container. A drawback of this method is the limited design possibilities for the shape. On account of the system, the hollow profile is cylindrical, and so it is difficult to produce noncylindrical outer containers. With noncylindrical shapes, it is in particular difficult to create a pouch wall of uniform thickness. Thus, in the production of containers with a bulbous shape, the minimum layer thickness of the pouch has to be ensured in the region of the greatest bottle cross section and thus maximum dimension of the pouch. However, at the same time, this means that, in the region with a smaller bottle cross section, the pouch has a greater layer thickness on account of a smaller dimension, since, both in the region of the larger and in the region of the smaller bottle cross section, the cylindrical hollow profile has a consistent starting thickness of the layer forming the pouch. The greater thickness of the pouch wall in the region of a smaller bottle cross section results in undesired stiffening of the pouch and thus in unfavorable behavior during collapsing and impairment of the folding of the pouch and thus in poorer residual emptying of the pouch filled with medium.

Such noncylindrical outer containers are desirable, however, for the purposes of product differentiation that is identifiable by consumers.

PROBLEM AND SOLUTION

The invention addresses the problem of providing a method for producing a container system that advantageously allows the interior of an outer container to be used fully and/or allows the production of noncylindrical outer containers. The invention addresses the further problem of providing a method, based thereon, for producing a liquid dispenser, and of providing a corresponding container system itself, and the liquid dispenser comprising the container system.

This problem is solved by a method for producing a container system having a dimensionally stable, prefabricated outer container and a collapsible inner container, in the form of a pouch, arranged within the outer container, wherein starting from the prefabricated outer container, at least one ply of a pouch material is applied to an inner wall of the outer container, and for this purpose, the pouch material is applied in the form of a liquid or powder to the inner wall, where, after solidifying or fusing, it forms a ply of a wall of the inner container, the ply detaching from the inner wall of the outer container intentionally when the inner container collapses. Further, after the container system has been produced, a liquid dispenser is produced by attaching a discharging head having an actuating handle and a pump to the container system. Still further, a container system is provided for use as part of a liquid dispenser, wherein the container system has a dimensionally stable outer container and a collapsible inner container, in the form of a pouch, arranged within the outer container, and the container system is produced by one of the above-described methods. Additionally, a liquid dispenser has the following features: a container system; a discharging head; and the container system is configured as described above.

The invention relates primarily to the abovementioned method for producing a container system having a dimensionally stable outer container and a collapsible inner container, in the form of a pouch, arranged within the outer container.

The outer container is either rigid or deformable counter to a restoring force. The outer container is preferably configured for the coupling of a discharging head, in particular in that it is provided with a neck portion that, for coupling the discharging head, has a thread or some other coupling means that retains the discharging head in a form- or force-fitting manner. Integral formation of the discharging head with a discharging opening is also possible.

The inner container is configured in the form of a pouch and has, in a manner corresponding to the outer container, an opening in the region of the neck portion. The inner container can be connected to the outer container in a materially bonded manner or be fixable by attaching a discharging head in the region of the opening or of the discharging head. The inner container is collapsible, wherein this is understood to mean the ability of the inner container to be reduced in volume without producing relevant restoring forces.

Provided between the inner container and outer container during operation is a ventilation region. The container system to be produced using the method does not, however, have this ventilation region immediately after the production of the inner container in the outer container, since the inner container rests flat against the inner side of the outer container. However, the inner container and outer container are preferably constituted such that the negative pressure of usually about 400 mbar that is established in the inner container in the meantime during operation is sufficient to cause the inner container and outer container to separate.

Starting from the prefabricated outer container, in the scope of the method according to the invention, at least one layer of a pouch material is applied to an inner wall of the outer container. For this purpose, the pouch material is applied in the form of a liquid or powder to the inner wall, where, after solidifying or fusing, the pouch material forms a ply of a wall of the inner container, said ply detaching from the inner wall of the outer container as intended when the inner container collapses.

The characteristic of this method is thus that the inner container is produced in the already produced outer container. To this end, the starting material that is intended to form a ply of the inner container is introduced in a liquid, optionally sprayed, or pulverulent form and is spread as a layer on the inner side of the outer container. There, the layer forms, optionally with application of heat, movement or other measures, a ply of the inner container, which subsequently detaches from the inner side of the outer container as intended during operation. In principle, it is also possible to deliberately bring about this detachment during the production process, for example by applying a positive pressure in the ventilation region or a negative pressure in the inner container.

In order that compensating air can pass into the ventilation region, a ventilation duct or some other ventilation possibility can be provided. Preferably, a hole is provided for this purpose in the outer container, and this hole can, depending on the application, be in the form of a capillary channel in order to force particularly slow ventilation but also to provide the possibility of configuring the container system as a squeeze bottle.

A plurality of plies that jointly form the wall of the inner container can be successively created in that in each case one layer of a pouch material is applied to the inner wall of the outer container or to an already applied ply of the inner container.

As a result of a plurality of plies that are created successively, it is possible for material-specific advantages to be combined, as will be explained below. Depending on the material combination, it may be advantageous for the plies to be produced with a temporal overlap, i.e. for a further ply to be produced when the previous one has not yet solidified, since in this way a particularly intimate connection can be created between the plies.

The above-mentioned creation of a multi-ply pouch by the successive introduction of a plurality of plies means and relates to only those plies of an inner container that can subsequently detach as a whole from the outer container on account of the choice of material for the outermost ply. The release ply discussed below, which usually remains partially on the outer container during the separation does not as such contribute towards a multi-ply nature within the meaning of the invention.

Therefore, it is advantageous when the outermost ply of the plies that jointly form the inner container, said outermost ply being applied as the first layer to the outer container, consists of a pouch material that exhibits internal cohesion and a connection to the ply immediately following on the inside that are sufficient for the outermost ply to remain completely on the inner container when the inner container is separated from the outer container.

Accordingly, the material of the outermost ply should be selected such that it enters into a connection with the material of the outer container that is as easily separable as possible, or is even already separated therefrom by the release ply explained below during the application of the layer in question. The inner connection of the material of the outermost ply and the tendency thereof to enter into a connection with the next ply on the inside have to be sufficient for said outermost layer to be able to detach completely from the inner side of the outer container, possibly using up the abovementioned release ply that will also be described below, such that this outermost ply as a whole becomes part of the inner container and no residues remain on the inner side of the outer container in the separated region. In a particular variant of the method, before a first layer of the pouch material is introduced, at least one layer of a coloring material is applied to the inner wall of the outer container. For this purpose, this coloring material is applied in the form of a liquid or powder to the inner wall, where, after solidifying or fusing, it forms a colored ply that either remains on the inner wall as intended or detaches from the inner wall of the outer container as intended when the inner container collapses, and forms an outer ply of the inner container.

Such a colored ply can thus form an inner ply of the outer container or an outer ply of the inner container. The control of whether the colored ply remains on the inner container or on the outer container is controlled via the materials used. Naturally, such a colored ply is only appropriate when the outer container is at least locally transparent or partially transparent.

In a further particular variant of the method, before a first layer of the pouch material and/or a layer of the coloring material is introduced, a layer of a release material is applied to an inner wall of the outer container. For this purpose, this release material is applied in the form of a liquid or powder to the inner wall, where it forms a release ply that favors the detaching of the inner container from the inner wall of the outer container as intended.

The release ply serves to allow unproblematic detachment of the outer container and inner container. Therefore, it is preferably made of a material that does not enter into too firm a connection/bond with the material of the outermost ply of the inner container and/or with the material of the outer container. For example, silicone or a silicone-based material or silicone rubber can be used here. A polyolefin is also suitable as the release ply.

A release ply is not absolutely necessary, however. If the outer container and the inner container are constituted at the contact surfaces such that no or only limited chemical bonds, in particular covalent bonds arise, it is possible to dispense with a release ply. The targeted detachment of the inner container from the outer container by means of positive pressure/negative pressure during production can also make the release layer dispensable.

The release ply can also serve for the achievement of increased freedom in the choice of the materials. If there is no release ply, there can be a problem when the outermost ply of the inner container consists of a material with a high melting point, since this is associated with the risk that when it is introduced, the inner side of the outer container is melted or influenced in some other way. The release layer can thus also effect thermal separation here.

In a particular variant, the release material is selected such that it forms a porous and/or air-permeable release ply. The outer container can have a ventilation hole, the end of which is directed into the interior of the outer container and is covered by the porous release ply. The porous release ply can comprise for example a ceramic powder that is introduced in the form of powder or in the form of a suspension. Possibly following evaporation of a carrier fluid, the powder forms a layer that, upon the subsequent introduction of the next layer, is not completely filled therewith, and so the possibility remains of air flowing into this release layer, for the purpose of separating the inner container from the outer container, thus making the separation easier.

This porosity favors the detachability of the inner container from the outer container, since, as a result, the ventilation region between the inner container and outer container is already created as it were during production. Ambient air can flow through the porous ply between the inner container and outer container, even when the inner container and the outer container are still bonded together.

In the simplest variant for carrying out the method, the pouch material flows into the outer container and is applied here to the inner side of the outer container or, alternatively, the outer container is completely filled therewith and excess liquid is then removed.

In one of the other variants of the method, the pouch material, the release material and/or the coloring material, in order to form a layer, is applied in the form of liquid droplets by means of a spraying method to the inner side of the outer container, or to a layer already applied there.

The corresponding material, in particular a plastic, is thus introduced in a liquefied form and preferably with addition of gas/air under pressure. As a result, the spreading of the material can be controlled easily.

Here, it is particularly advantageous when, after the layer has been applied via a spraying method, the layer is heated so as to cause homogenization of the layer thickness and/or filling of gaps that have remained during spraying.

The material applied to the inner side of the outer container or to an already created ply has to solidify after being introduced, in order to form a stable ply of the inner container even after it has been separated from the outer container. For this purpose, various possibilities are available. In the preferred possibility, the corresponding pouch material is introduced in a thermally liquefied state and solidifies as it cools. Alternatively, the material can also be introduced together with a solvent, which subsequently evaporates, optionally with input of heat, and as a result causes the inner container to solidify.

In another variant of the method, the pouch material, the release material and/or the coloring material, in order to form a layer, is applied in the form of a powder to the inner side of the outer container, or to a layer already applied there.

In a manner corresponding to the liquid introduction, it is also possible for the powder to be blown in, preferably in the form of granular particles with a size of between 1 and 100 µm, in a similar manner to powder coating with a gun-like tool and to adhere to the inner side of the outer container or to a previously introduced ply. Optionally, pretreatment steps can be provided on the inner side, for example the application of a conductive layer (primer) when the outer container consists of a nonconductive material and adhesion is provided in an electrostatic manner. However, other possibilities for adhesion are also possible, for example, the application of moisture to the inner side of the outer container.

Furthermore, it is possible for the pouch material in the form of a powder to be applied directly as part of a suspension with a carrier fluid in a sprayed or nonsprayed form to the inner side of the outer container, from where the carried fluid evaporates and leaves the powder behind.

In all cases, it is preferred that, after the layer of powder has been applied, the layer is heated so as to cause the powder to melt and thus to form a continuous layer.

For the largely homogeneous spreading of the pouch material, it is advantageous when, after the pouch material has been introduced into the outer container, spreading of the liquid material is brought about to form an extensive and continuous layer by the outer container being moved, in particular by the outer container being rotated about one or more axes of rotation.

For the inner container, in particular the following plies are considered advantageous.

As the support ply, which confers the actual stability on the wall of the inner container, in particular plastic ionomer is appropriate, i.e. ionomer made of ethylene-methacrylic acid copolymers with embedded metal ions, in particular with sodium or zinc ions. This material has good puncture resistance and high flexibility and buckling resistance. In addition, the support ply has a low melting point, and so when it is used as the outer layer of the inner container, the adhesion of the produced inner container to the outer container is avoided. The plastic ionomers available from Dupont under the trade name SURLYN® are particularly suitable.

It is also advantageous to use an ethylene-vinyl alcohol copolymer (EVOH). This material effectively reduces the penetration of oxygen into the inner container and thus, as a type of barrier ply, reduces the risk of oxidation.

A ply made of polyamide or alternatively of polyethylene, in particular LDPE or LLDPE, may likewise be expedient. These materials are highly suitable in particular as the innermost ply. In particular polyamides are highly suitable in order to prevent smells from evaporating through the wall of the inner container. Alternatively, it is also possible to use EVA (ethylene-vinyl acetate copolymers) here.

In the case of two-ply inner containers, a layer of a plastic ionomer with an external layer of EVOH or an internal layer of polyamide is considered particularly advantageous. In the case of a three-ply or multi-ply design, from inside to outside, a ply made of polyamide, then a ply made of plastic ionomer and also a ply made of EVOH is particularly advantageous. For the purpose of detachability from the inner side of the outer container, it is also advantageous for the plastic ionomer to be arranged as the last ply.

For the inner container, it is proposed that the latter have preferably at least one layer made of a plastic ionomer.

It is also proposed that the inner container have at least one layer made of an ethylene-vinyl alcohol copolymer.

The dimensionally stable outer container is configured such that it is either not deformable to a relevant extent on account of the selected material or has resilient properties such that it returns to its original shape after an interim reduction in volume.

In particular, it is proposed that a prefabricated outer container that has at least one layer made of PP and/or at least one layer made of glass be used for the described method.

A particular design results when a prefabricated outer container that at least partially has a wall made of gas-permeable porous material is used. With such a design, it is possible to dispense with a separate macroscopic ventilation channel. Instead, air can penetrate through the porous structure of the outer container. This makes it easier to detach the inner container from the outer container. A corresponding wall design is known from EP 0893356 A1.

The invention also relates to a method for producing a liquid reservoir. Here, after the container system has been produced as described above, a discharging head having an actuating handle and a pump is attached to the container system.

However, alternatives to such a discharging head are also conceivable. Thus, a squeeze bottle concept without an actuating handle and pump can also be used, in which provision is made as intended upon use for the liquid reservoir itself to be compressed. Although this is associated with the air between the inner container and outer container also being compressed, if a ventilation channel with a high throttle effect or even a nonreturn valve is provided in the region of the ventilation channel, sufficient pressurization of the liquid for discharging can also be achieved with simultaneous pressurization of the air.

As already mentioned at the beginning, this attachment of the discharging head can in particular also serve the purpose of creating secure fixing, in the opening region of the outer container, between the inner container and outer container. However, this can also be achieved in other ways, for example by a separation-inhibiting geometry in this region on the inner side of the outer container.

The invention also relates to a container system for use as part of a liquid dispenser, said container system having a dimensionally stable outer container and a collapsible inner container, in the form of a pouch, arranged within the outer container, said container system having been produced by the above-described method.

Here, it is particularly advantageous when the outer container has a lateral wall and a bottom wall, and the lateral wall has a shape other than a cylindrical shape.

Furthermore, the abovementioned multi-ply nature is particularly important, wherein the outermost ply, which has been applied as first layer or after prior application of a release ply during production, is as a whole part of the inner container. By contrast, the outer container is preferably formed in a single ply, a possible release ply, which remains entirely or partially on the inner side of the outer container, not being taken into consideration.

The described method is advantageous in particular with such noncylindrical shapes, since it makes it particularly readily possible to use up the internal volume. Thus, for example, bulbous outer containers can be completely filled in this way.

The invention also relates to a liquid dispenser having such a container system and a discharging head. The discharging head has in this case preferably an actuating handle, by means of which a pump can be actuated. As already described above, however, designs with discharging heads without a pump and actuating handle are also conceivable and sometimes appropriate.

BRIEF DESCRIPTION OF THE DRAWINGS

Further advantages and aspects of the invention will become apparent from the claims and from the following description of preferred exemplary embodiments of the invention, which are explained in the following text with reference to the figures.

DETAILED DESCRIPTION OF THE EXEMPLARY EMBODIMENTS

Figure 1:
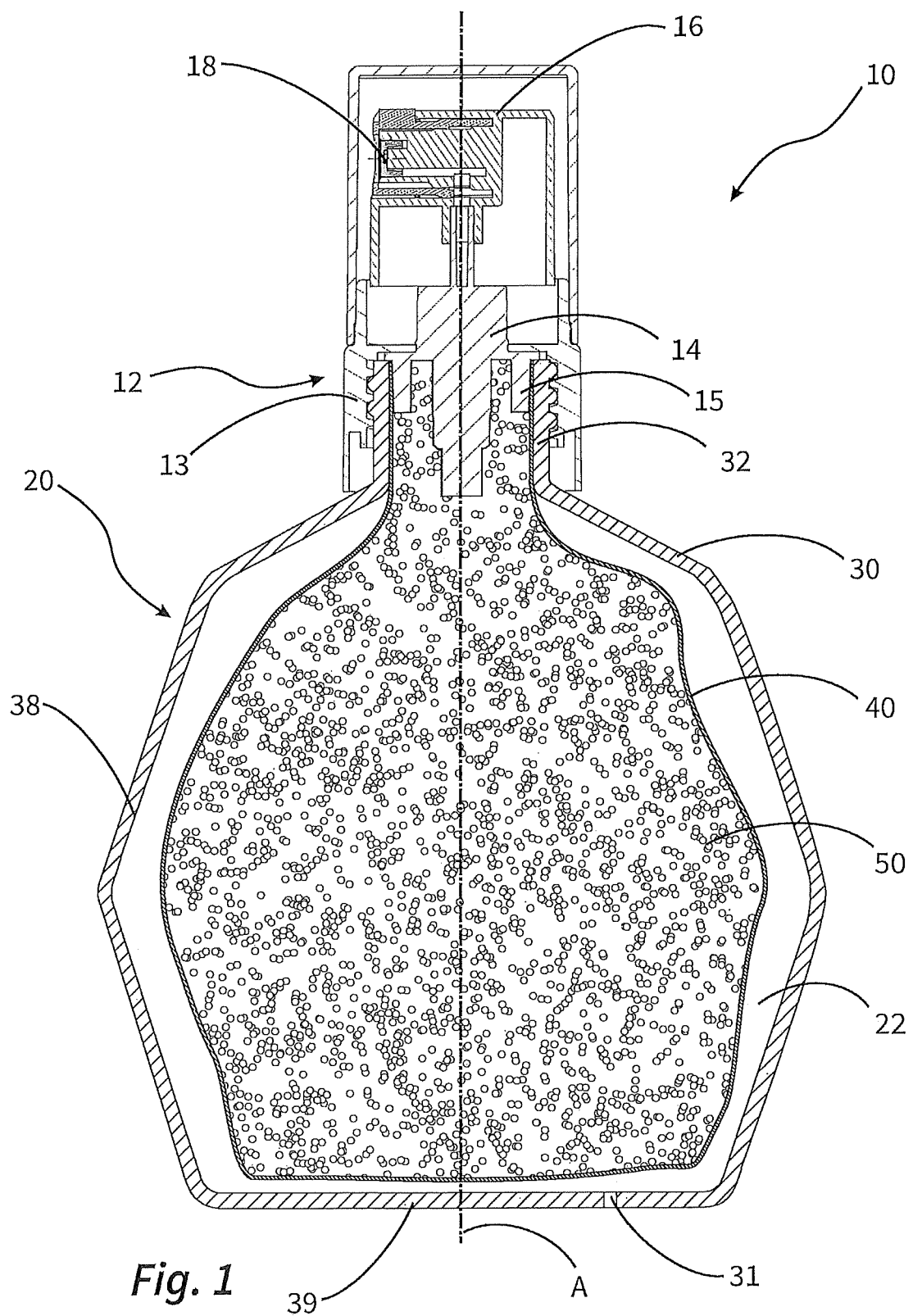
FIG. 1 shows a liquid dispenser according to the invention, the container system of which has been produced using the above-described method.

FIG. 1 shows a liquid dispenser 10 according to the invention, which has been produced by means of the method according to the invention.

The liquid dispenser 10 has a discharging head 12 that has been screwed onto a container system 20.

The discharging head 12 is configured to spray liquid out of the container system 20 and, for this purpose, has a housing 13 with an internal thread and a pump device 14 that is not illustrated in detail. Placed on the pump device 14 is a discharging head 12 having an actuating handle 16 that can be depressed in order to actuate the pump 14 and thus to deliver liquid from the container system 20 to a discharging opening 18 at which the liquid is discharged in an atomized form.

The container system 20 is in the form of what is known as an airless container system. It has a dimensionally stable outer container 30 and a collapsible and pouch-like inner container 40. The liquid to be discharged is accommodated in the inner container 40, which is completely filled with the liquid. As the internal volume of the inner container 40 drops while the liquid reservoir gradually empties, this is compensated for by air flowing into a ventilation region 22 between the outer container 30 and the inner container 40 through a ventilation hole 31 in the outer container 30.

The outer container has a container neck 32, in the region of which the housing 13 of the discharging head 12 has been screwed on. Provided in the region of the pump device 14 is a clamping collar 15 that presses the wall of the inner container 40 against the inner side of the container neck 32 and as a result creates a clamped connection at this point.

The outer container 30, which is rotationally symmetric to the central axis A, has a shape that is noncylindrical, and in the present case is rather bulbous.

In order, in spite of such a shaping, to be able to provide an inner container 40 that almost completely uses up the internal volume of the outer container 30, use is made of a production method which is shown in the further figures and explained in the following text.

Figure 2A:
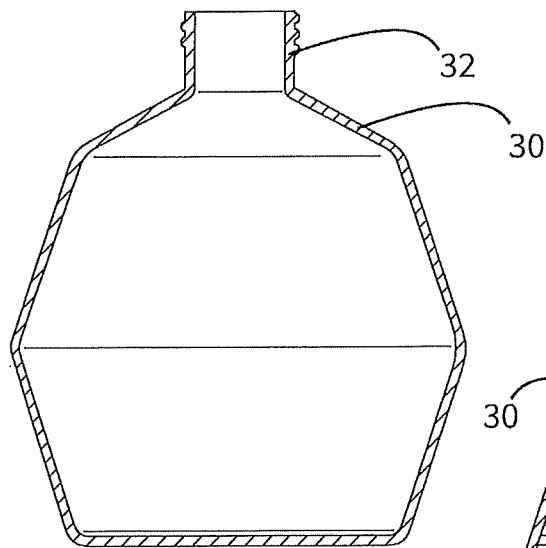
FIGS. 2A to 2D and 3A to 3D show two methods for producing the container system starting from the already produced outer container, wherein the pouch material for forming the inner container is introduced in the form of a liquid.
Figure 2B:
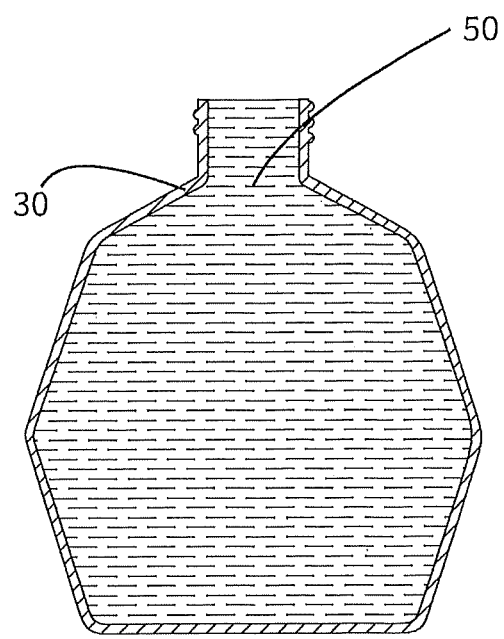
Figure 2C:
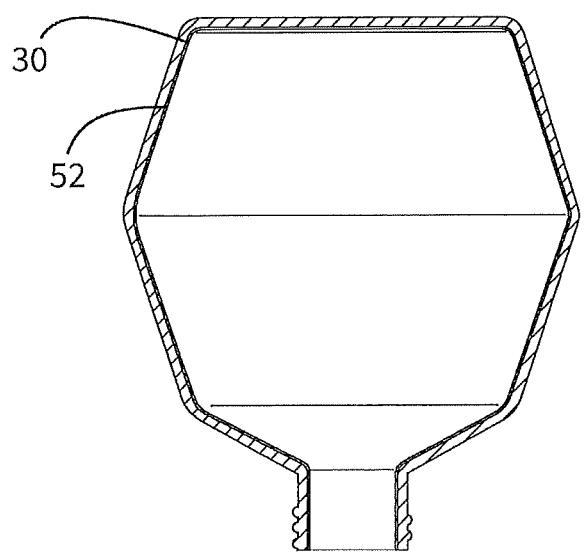
Figure 2D:
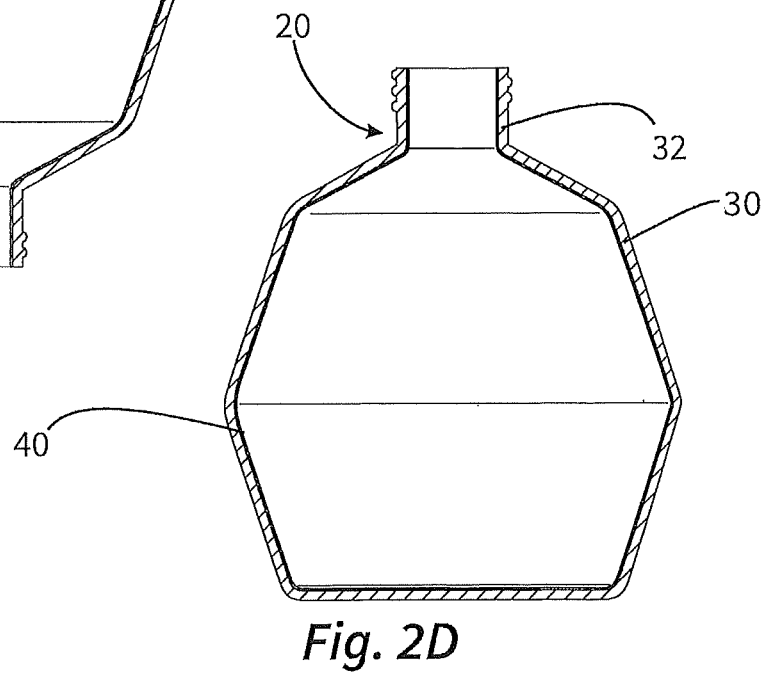

FIGS. 2A to 2D show a first variant thereof. Starting from the outer container 30 previously produced, for example by injection molding or a stretch blow molding method, a liquid plastic 50 is introduced into the outer container 30, the melting point of which is lower than that of the material of the outer container 30. Subsequently, the molten plastic material is mostly removed from the outer container 30 again in the manner illustrated in FIG. 2C, such that only a layer 52, wetting the inner side of the outer container 30, of the plastic remains. This can subsequently be heated again to below the melting point or softening point of the outer container 30, such that any remaining inhomogeneities in the layer thickness are reduced. As soon as the plastic has cooled, it forms an inherently stable, but deformable ply, which then, as illustrated in FIG. 2D, forms the inner container 40.

As is apparent from FIG. 2D, this inner container 40 takes up almost the entire internal volume of the outer container, such that a large liquid quantity to be discharged can subsequently be poured in. During operation, the inner container then detaches from the inner side of the outer container 30 and in this way allows the reduction in volume of the inner container 40.

Figure 3A:
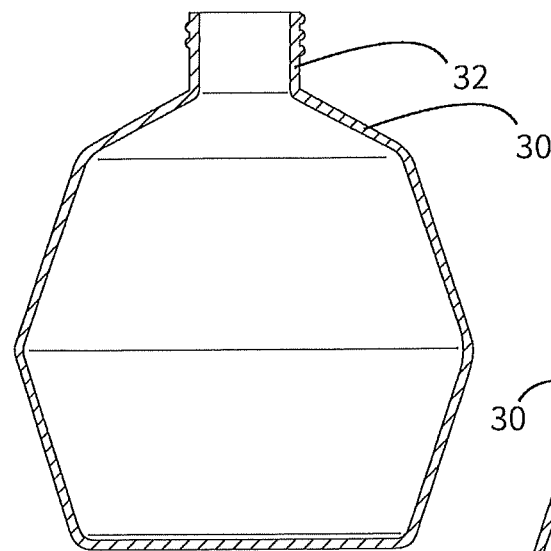
Figure 3B:
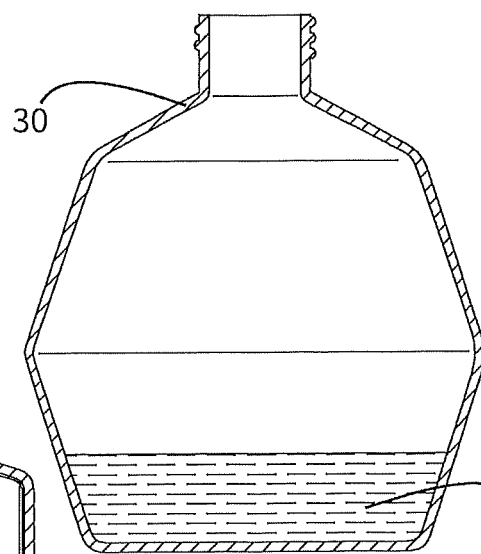
Figure 3C:
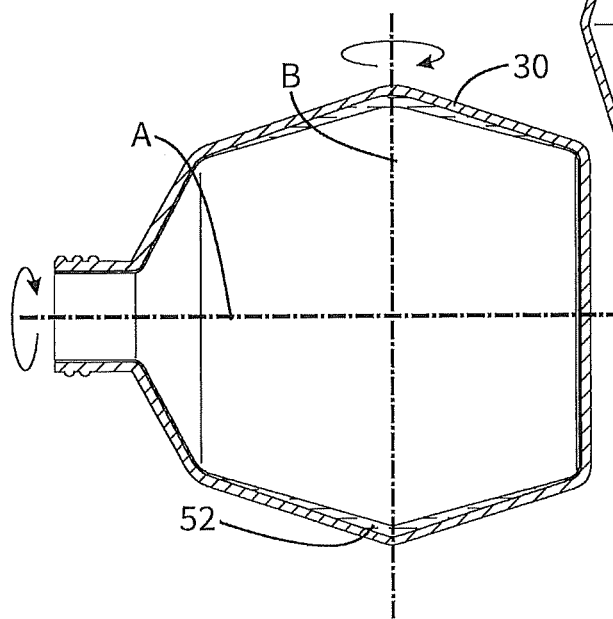
Figure 3D:
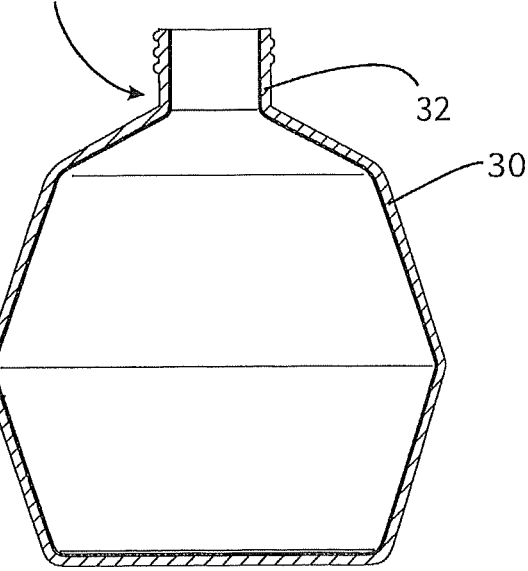

In the design according to FIGS. 3A to 3D, a smaller quantity of molten plastic 50 is introduced into the outer container 30. This is subsequently spread over the inner side of the outer container 30 by the outer container 30 being moved. In particular, rotation of the outer container 30 can be used, wherein rotation about different axes of rotation, in the present case for example the longitudinal axis A and an axis orthogonal thereto, takes place preferably for homogeneous spreading. The result, as illustrated in FIG. 3D, is similar to that of the first exemplary embodiment in FIGS. 2A to 2D. It may be necessary to remove the resultant ply of plastic, forming the inner container 40, in the region of the container neck 30 before the layer 52 solidifies, or to subsequently mechanically open same.

Figure 4A:
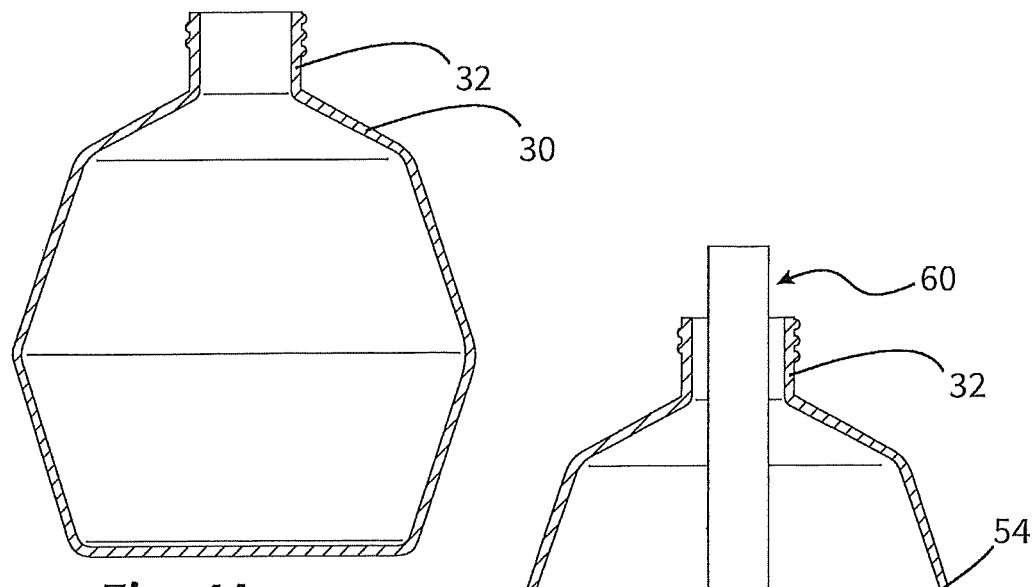
FIGS. 4A to 4D show a method for producing the container system, in which, starting from the already produced outer container, the pouch material for forming the inner container is introduced in a sprayed form.
Figure 4B:
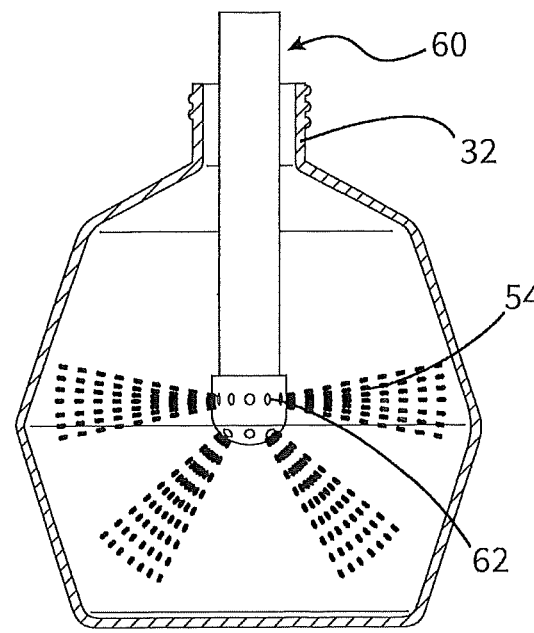
Figure 4C:
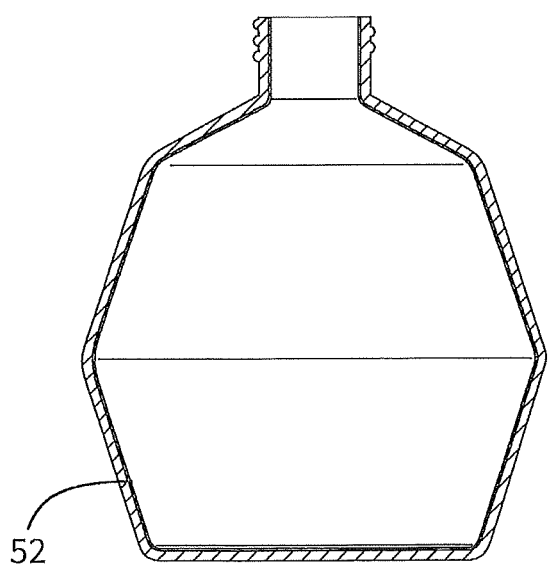
Figure 4D:
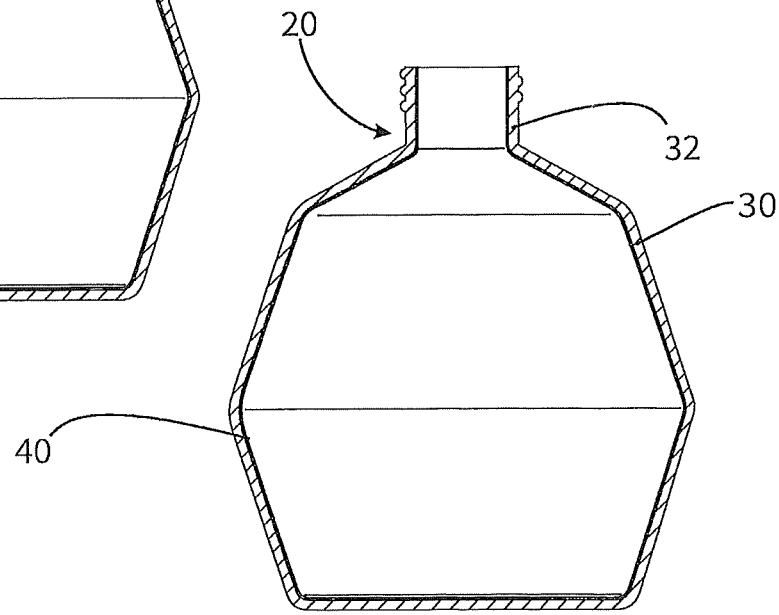

FIGS. 4A to 4D show a further variant. In this case, the liquid plastic is not introduced directly in the form of a liquid but in the form of fine droplets, i.e. by spraying. For this purpose, an apparatus 60 having a spray opening 62 is provided. The spraying can take place with an additional feed of air, in particular heated air. Again, as shown in FIG. 4C, a continuous layer of plastic material is applied as a result to the inner side of the outer container 30, said layer forming the inner container 40 after it solidifies.

FIGS. 5A to 5D show an alternative design. In this design, the plastic is introduced not in a liquid form but in the form of a powder 70. Purely by way of example, for this purpose, a discharging element 80 is provided, which is introduced into the outer container 30 and through which powder is dispensed. For this purpose, outlet openings 82 are provided. The powder settles again, in the manner shown in FIG. 5C, on the inner side of the outer container 30. If the powder is intended to adhere here on the basis of electrostatic forces, an outer container 30 that is conductive is required. However, it is also possible to first of all introduce an adhesion-promoting layer into the outer container 30 and only then to introduce the powder. Thus, it is possible to wet the inner side of the outer container 30 with moisture in order that the powder sticks here. Wetting with a conductive liquid (primer) can also be chosen for the purposes of electrostatic adhesion. The powder is preferably electrostatically charged before being dispensed.

Figure 5A:
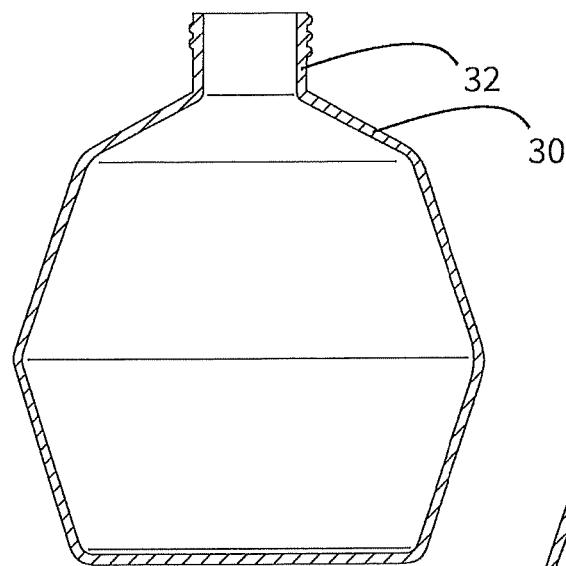
FIGS. 5A to 5D show a method for producing the container system, in which, starting from the already produced outer container, the pouch material for forming the inner container is introduced in the form of a powder.
Figure 5B:
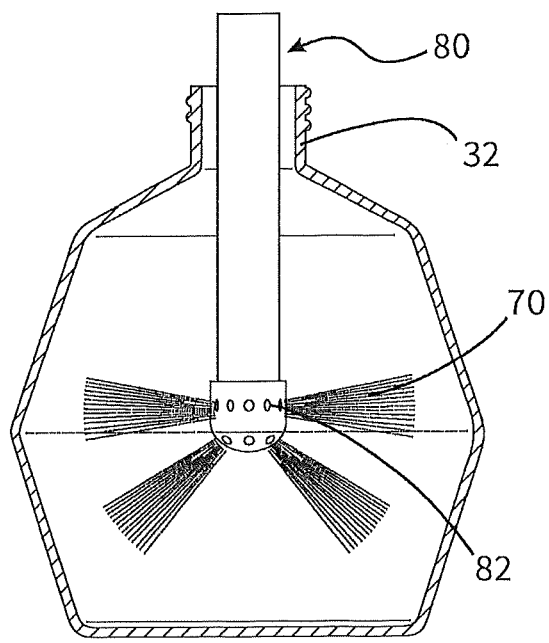
Figure 5C:
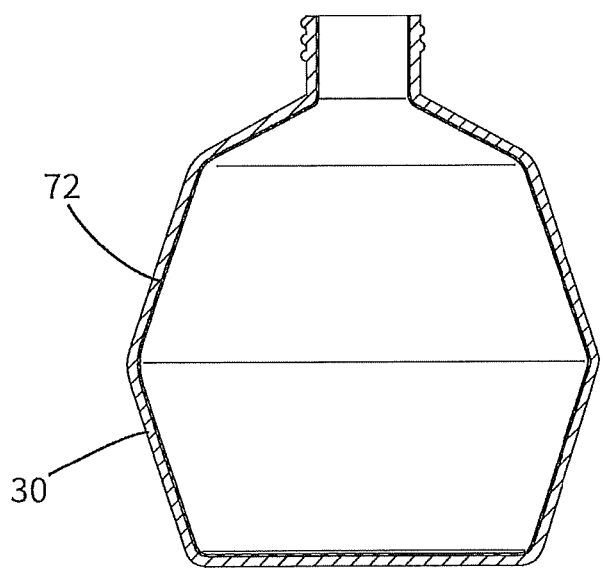
Figure 5D:
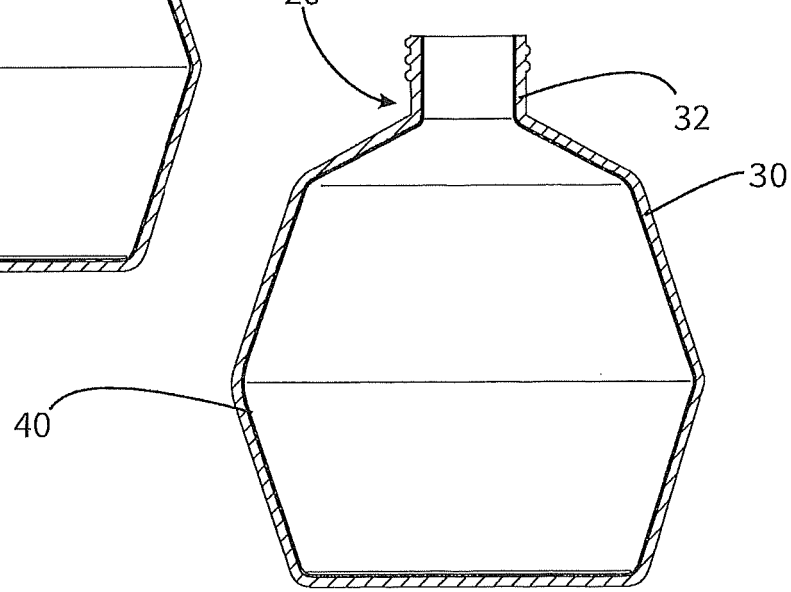

The powder layer 72 that still consists of individual particles and is illustrated in FIG. 5C is subsequently melted by heating of the container and forms a continuous ply that subsequently forms the inner container 40.

A variant in which the powder is introduced in the form of a suspension in a carrier fluid is not illustrated. However, in terms of illustration, such a method would look the same as FIGS. 2A to 4D.

The above procedures are related, for the purposes of simplification, to only one ply that forms the inner container 40. In practice, however, it is considered advantageous when several plies are used here that each have specific functions.

Figures 6A, 6B:
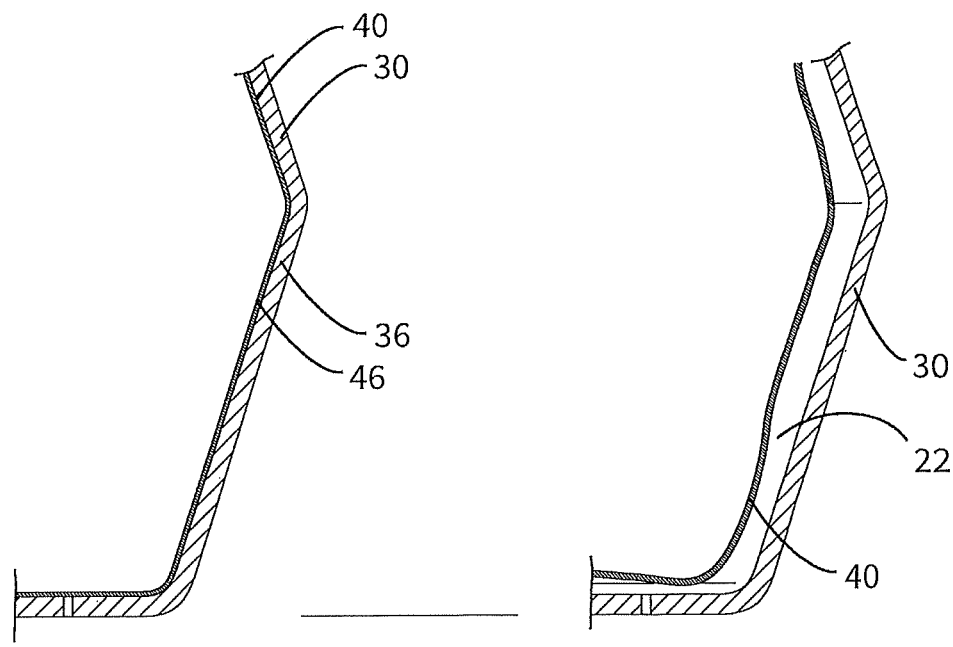
FIGS. 6A and 6B, 7A and 7B, 8A and 8B, 9A and 9B, and 10A and 10B show different designs of the outer container and of the inner container, which are each producible using a method according to FIGS. 2A to 5D or combinations thereof.

FIGS. 6A and 6B show once again the simplest variant with only one ply 46 that is applied to the inner side of the outer container 30 and, as shown in FIG. 6B, detaches from the outer container 30 during operation. If only one ply is used, it is preferably a plastic ionomer which combines good mechanical properties with a low melting point. The use of the plastic ionomer SURLYN® is preferred.

Figures 7A, 7B:
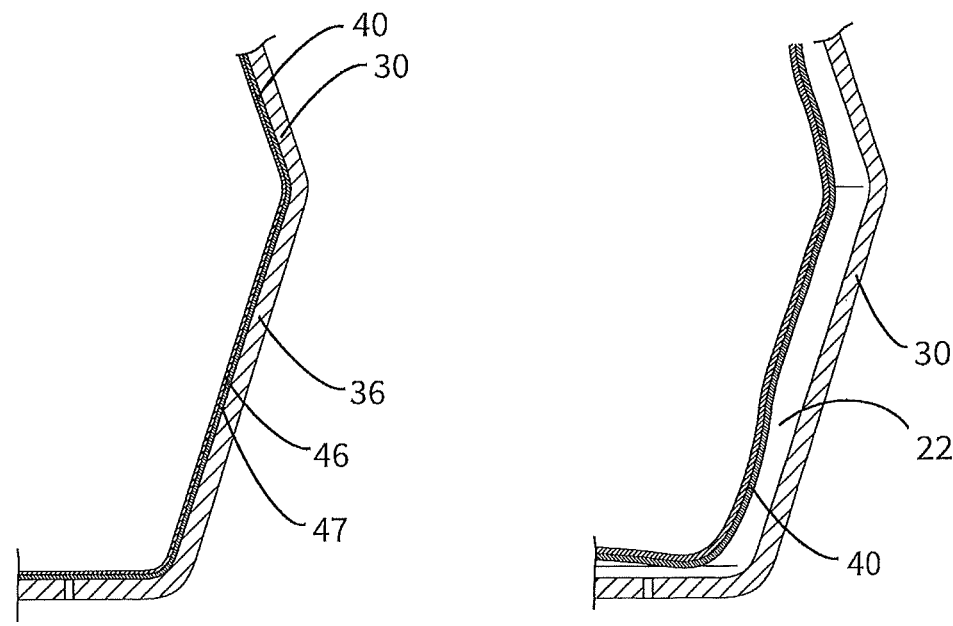

FIGS. 7A and 7B show a design in which the inner container 40 has two plies 46, 47. Here, the inner ply could for example be a polyamide ply that particularly readily prevents the smells in liquid from escaping, while the other ply could be a plastic ionomer ply, which again determines the mechanical properties of the inner container 40.

Figure 8A:
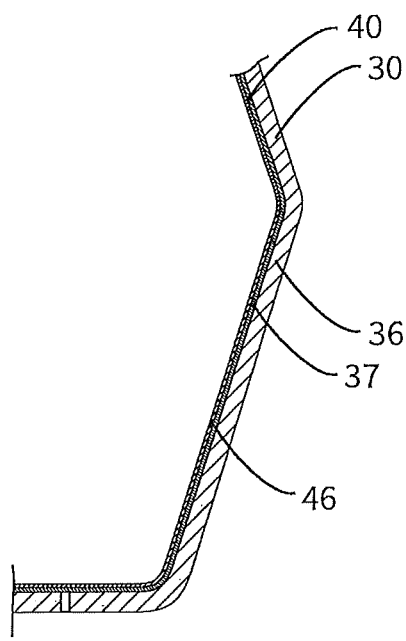
Figure 8B:
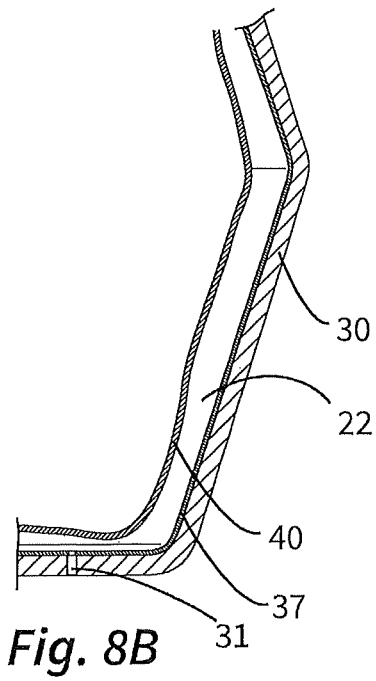

In the case of the design in FIGS. 8A and 8B, the inner container 40 is again formed as a single ply. Nevertheless, two plies are applied successively in the manner described in FIGS. 2A to 5D. The ply 37 applied first of all to the inner side of the outer container 30 is a colored ply, however, which, as intended, remains on the outer container 30 when the inner container 40 detaches from the outer container 30. The colored ply gives the outer container 30, which is otherwise produced from transparent milky polypropylene, a color, this having a particular esthetic appeal on account of the internal attachment of the colored ply and additionally being mechanically protected from external loads.

Figure 9A:
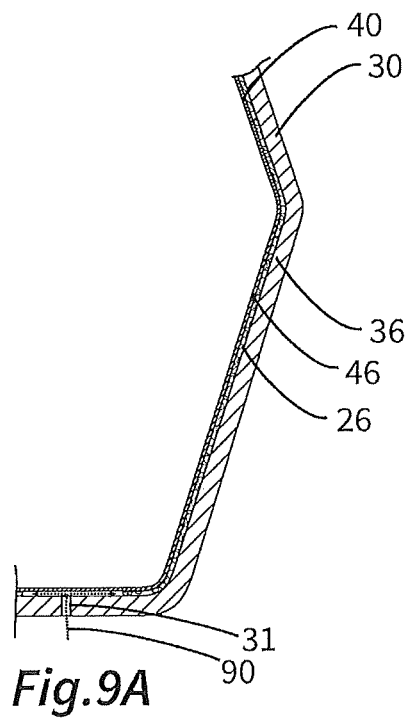
Figure 9B:
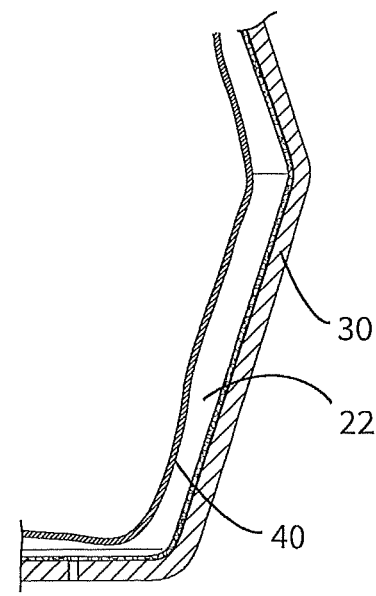

In the variant according to FIGS. 9A and 9B only a single-ply design of the inner container 40 is again provided, wherein, in this case, a multi-ply design could also be provided instead. The characteristic of the design according to FIGS. 9A and 9B is that the first ply applied to the inner side of the outer container 30 is a release ply 26 that fulfills a functional purpose only during production. This release ply 26 makes it possible to produce thermal insulation, meaning that the material of the ply 46 of the inner container 40 can have a melting point above that of the outer container 30. On account of the release layer 26, however, the inner side of the outer container 30 does not melt. A suitable material for such a release layer is for example silicone or a silicone-based material.

Such a release layer can also be advantageous because it makes it possible for air to already pass into the intermediate region formed by the release layer 26 before the inner container 40 detaches from the outer container 30. For this purpose, the release layer 26 has to consist of an at least partially porous material. This allows air to pass into the intermediate region in the manner indicated by the arrow 90 and to favor the detaching of the inner container 40. Such a release layer can be formed in particular by a ceramic powder that is fed in the form of a powder or in the form of a suspension with subsequent evaporation of the carrier fluid.

Figure 10A:
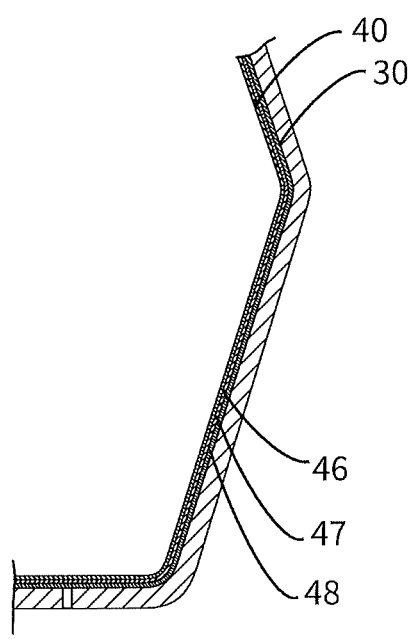
Figure 10B:
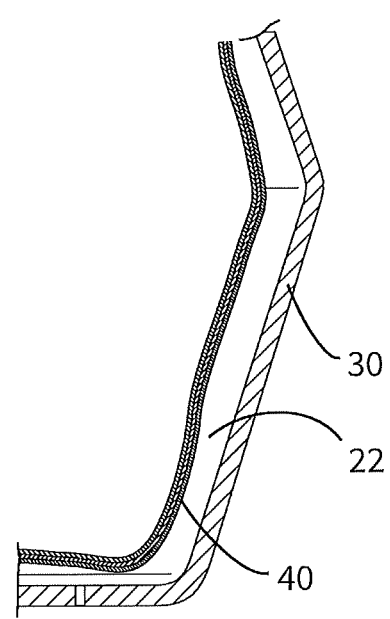

In the design according to FIGS. 10A and 10B, the characteristic is that the inner container 40 is in this case formed in a three-ply manner. The plies 46, 47, 48 are for example polyamide, plastic ionomer and EVOH in that order in this example.

The invention claimed is:

1. A method for producing a container system for a liquid dispenser, the produced container system having a dimensionally stable outer container and a collapsible inner container, in the form of a pouch, arranged within the outer container, the method comprising the following steps:

starting from a prefabricated outer container, applying a plurality of plies of more than one type of pouch material to an inner wall of the prefabricated outer container in the form of a liquid or powder, solidifying or fusing the plurality of plies and thereafter jointly forming a wall of the inner container, the plurality of plies detaching and separating from the inner wall of the prefabricated outer container when and if the inner container collapses within the prefabricated outer container; and the step of applying the plurality of plies of more than one type of pouch material to the inner wall of the prefabricated outer container including creating the plurality of plies by applying one layer of one type of the pouch material to the inner wall of the prefabricated outer container or to an already applied one of the plies of the plurality of plies of a different type of the pouch material, wherein the type of the pouch material utilized for an outermost one of the plies of the plurality of plies that jointly form the wall of the inner container comprises a pouch material exhibiting internal cohesion and a connection to an immediately adjacent one of the plurality of plies sufficient for the outermost ply to remain completely on the inner container when and if the inner container separates from and collapses within the prefabricated outer container.

2. A method for producing a container system for a liquid dispenser, the produced container system having a dimensionally stable outer container and a collapsible inner container, in the form of a pouch, arranged within the outer container, the method comprising:

starting from a prefabricated outer container, applying at least one ply of a pouch material to an inner wall of the prefabricated outer container in the form of a liquid or powder, solidifying or fusing the at least one ply and thereafter forming a wall of the inner container, the at least one ply detaching and separating from the inner wall of the prefabricated outer container when and if the inner container collapses within the prefabricated outer container;

before the at least one ply of the pouch material is applied to the inner wall of the prefabricated outer container, at least one layer of a coloring material is applied in the form of a liquid or powder to the inner wall of the prefabricated outer container; and solidifying or fusing the at least one layer of the coloring material and thereafter forming a colored ply that either remains on the inner wall of the prefabricated outer container or detaches from the inner wall of the prefabricated outer container when and if the inner container collapses within the prefabricated outer container and forms an outer ply of the inner container.

3. A method for producing a container system for a liquid dispenser, the produced container system having a dimensionally stable outer container and a collapsible inner container, in the form of a pouch, arranged within the outer container, the method comprising:

starting from a prefabricated outer container, applying at least one ply of a pouch material to an inner wall of the prefabricated outer container in the form of a liquid or powder, solidifying or fusing the at least one ply and thereafter forming a wall of the inner container, the at least one ply detaching and separating from the inner wall of the prefabricated outer container when and if the inner container collapses within the prefabricated outer container;

providing a layer of release material;

before the at least one ply of the pouch material is applied to the inner wall of the prefabricated outer container, the layer of release material is applied to the inner wall of the prefabricated outer container in the form of a liquid or powder, the layer of release material forming a release ply that favors the detaching of the at least one ply from the inner wall of the prefabricated outer container.

4. The method as claimed in claim 3, including selecting the layer of release material such that the layer of release material forms a porous and/or air-permeable release ply, and the prefabricated outer container has a ventilation hole, an end of the ventilation hole that is directed into an interior of the prefabricated outer container being covered by the porous and/or air-permeable release ply.

5. The method as claimed in claim 1, wherein at least one of the types of the pouch material is applied, in the form of liquid droplets by spraying, to the inner wall of the prefabricated outer container, or to one of the plies of the plurality of plies already applied to the inner wall of the prefabricated outer container.

6. The method as claimed in claim 1, wherein at least one of the types the of pouch material is applied in the form of a powder to the inner wall of the prefabricated outer container, or to one of the plies of the plurality of plies already applied to the inner wall of the prefabricated outer container.

7. The method as claimed in claim 1, including introducing at least one of the types of the pouch material in the form of a liquid material into the prefabricated outer container, and thereafter spreading the liquid material on the inner wall of the prefabricated outer container by moving the prefabricated outer container.

8. The method as claimed in claim 1, wherein:
at least one ply of the plurality of plies is made of a plastic ionomer; or
at least one ply of the plurality of plies is made of an ethylene-vinyl alcohol copolymer (EVOH); or
at least one ply of the plurality of plies is made of polyamide; or
at least one ply of the plurality of plies is made of polyethylene.

9. The method as claimed in claim 1, wherein to form the wall of the inner container, the plurality of plies are made of the following:
at least plastic ionomer and polyethylene; or
at least plastic ionomer and polyamide; or
at least plastic ionomer and LDPE.

10. The method as claimed in claim 1, further including:
starting from a prefabricated outer container that has at least one ply made of PP; and/or
starting from a prefabricated outer container that has at least one ply made of glass; and/or
starting from a prefabricated outer container that at least partially has a wall made of a gas-permeable porous material.

11. A method for producing a liquid dispenser, wherein after the container system has been produced as claimed in claim 1, a discharging head having an actuating handle and a pump is attached to the container system.

12. A container system for use as part of a liquid dispenser, wherein the container system has a dimensionally stable prefabricated outer container and a collapsible inner container, in the form of a pouch, arranged within the prefabricated outer container, and the container system has been produced by the method as claimed in claim 1.

13. The container system as claimed in claim 12, wherein the prefabricated outer container has a lateral wall and a bottom wall, and the lateral wall has a shape other than a cylindrical shape.

14. The container system as claimed in claim 12, wherein the plurality of plies of the inner container are each made of a different type of the pouch material, and the prefabricated outer container comprises a single ply.

15. A liquid dispenser having a container system and a discharging head, and the container system is configured according to claim 12.

16. The method as claimed in claim 5, further including one of the following: after the at least one type of the pouch material has been applied by spraying, the at least one type of the pouch material is heated so as to cause homogenization of a thickness of the at least one type of the pouch material and/or filling of gaps remaining after spraying; or the liquid droplets comprise a solvent which evaporates after being introduced for the purpose of solidifying the at least one type of the pouch material.

17. The method as claimed in claim 6, further including one of the following: the at least one type of the pouch material in the form of the powder is introduced in a dry state into the prefabricated outer container and settles on the inner wall thereof; or the inner wall of the prefabricated outer container is conductive and the at least one type of the pouch material in the form of the powder is introduced in a dry state and in an electrostatically charged manner into the prefabricated outer container and settles on the conductive inner wall of the prefabricated outer container; or the at least one type of the pouch material in the form of the powder is applied as part of a suspension with a carrier fluid in a sprayed or non-sprayed form to the inner wall of the prefabricated outer container, from which the carrier fluid evaporates and leaves the powder behind.

18. The method as claimed in claim 6, wherein after the powder has been applied to the inner wall of the prefabricated outer container or to one of the plies of the plurality of plies already applied to the inner wall of the prefabricated outer container, the powder is heated to cause the powder to melt.

19. The method as claimed in claim 1, wherein the outermost ply remains in its entirety on the inner container when and if the inner container separates from the prefabricated outer container.

20. The method as claimed in claim 3, wherein at least one layer of coloring material is introduced after the layer of release material is applied to the inner wall of the prefabricated outer container.

21. The method as claimed in claim 1, further including introducing a negative pressure within the inner container or introducing a positive pressure between the inner container and the prefabricated outer container, and thereby separating the inner container from, and collapsing the inner container within, the prefabricated outer container.

22. The method as claimed in claim 2, further including introducing a negative pressure within the inner container or introducing a positive pressure between the inner container and the prefabricated outer container, and thereby separating the inner container from, and collapsing the inner container within, the prefabricated outer container.

23. The method as claimed in claim 3, further including introducing a negative pressure within the inner container or introducing a positive pressure between the inner container and the prefabricated outer container, and thereby separating the inner container from, and collapsing the inner container within, the prefabricated outer container.

24. The method as claimed in claim 1, wherein the solidifying or fusing the plurality of plies comprises allowing the plurality of plies to cool.

25. The method as claimed in claim 2, wherein the solidifying or fusing the at least one ply comprises allowing the at least one ply to cool.

26. The method as claimed in claim 3, wherein the solidifying or fusing the at least one ply comprises allowing the at least one ply to cool.

\* \* \* \* \*